F. LAMBERT.
FLUID METER.
APPLICATION FILED MAR. 13, 1915.
1,155,667.
Patented Oct. 5, 1915.
2 SHEETS—SHEET 1.
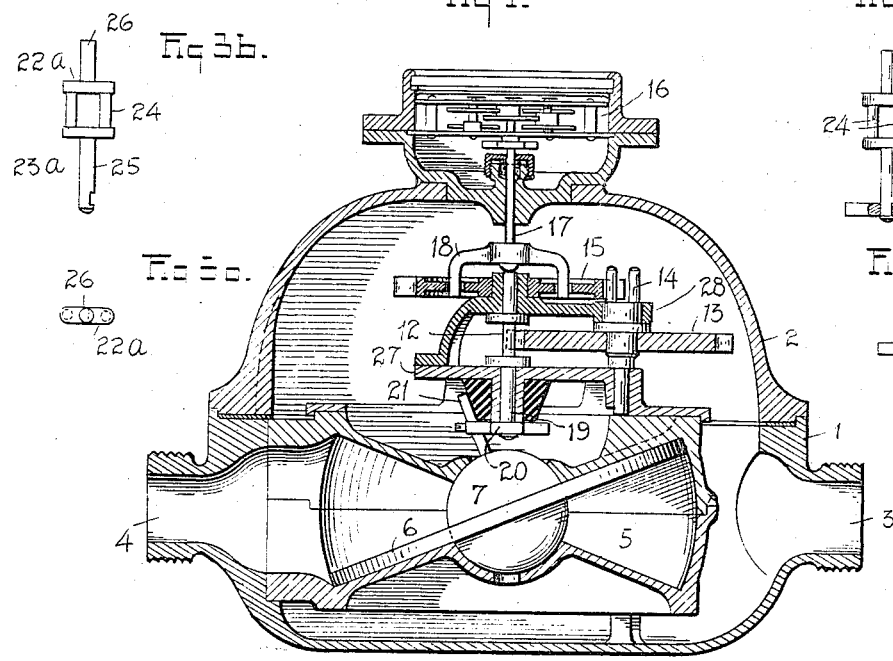
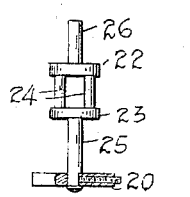
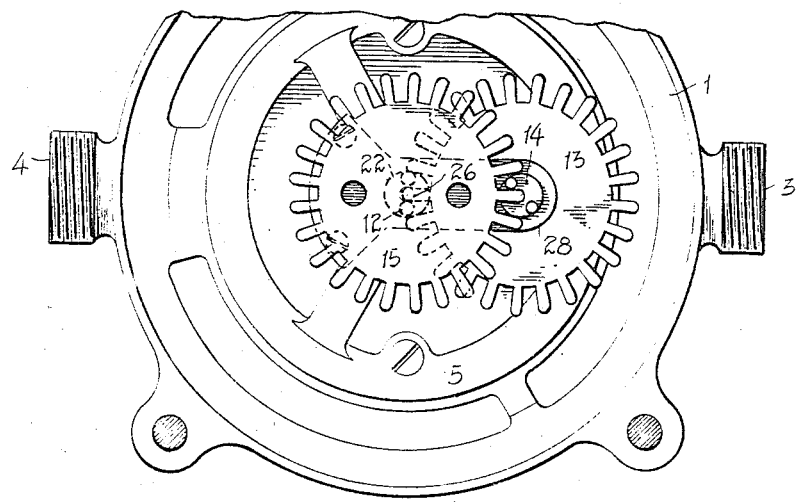

F. LAMBERT.
FLUID METER.
APPLICATION FILED MAR. 13, 1915.

1,155,667.

Patented Oct. 5, 1915.
2 SHEETS—SHEET 2.

Attest:
H. Massey
Paul H. Franke

Inventor:
Frank Lambert
by Marbles Matty
Attys

UNITED STATES PATENT OFFICE.

FRANK LAMBERT, OF NEW YORK, N. Y.

FLUID-METER.

1,155,667.  Specification of Letters Patent.  Patented Oct. 5, 1915.

Application filed March 13, 1915. Serial No. 14,268.

*To all whom it may concern:*

Be it known that I, FRANK LAMBERT, a citizen of the United States of America, and a resident of the borough of Brooklyn, county of Kings, city and State of New York, have invented certain new and useful Improvements in Fluid-Meters, of which the following is a specification.

My invention relates to improvements in fluid meters.

I will describe my invention with relation to its application to nutating disk meters, though it will be understood that in so doing I do not intend to limit my invention to its application to nutating disk meters.

My invention consists in transmission mechanism, interposed between the motor member of the meter and the registering mechanism of the meter, of a positive but intermittent drive character, the non-driving period of such transmission mechanism being synchronized with the motor member of the meter to coincide with those periods of the motor at which the tendency to stick at low rates of flow exists. In this way load is taken entirely from the motor member of the meter at the times when that motor member is most likely to stop or stick at low rates of flow, and thereby the tendency of the meter to stop or stick at low rates of flow is overcome and the meter is more sensitive and accurate at low rates of flow than it would be otherwise.

Other features of my invention will be pointed out hereafter.

The objects of my invention are, to render fluid meters more nearly accurate at low rates of flow; to reduce to the minimum tendency of such meters to stick or stop at such low rates of flow; and to reduce the cost of material and manufacture.

I will now proceed to describe my invention with reference to the accompanying drawings, and will then point out the novel features in claims.

Figure 4:
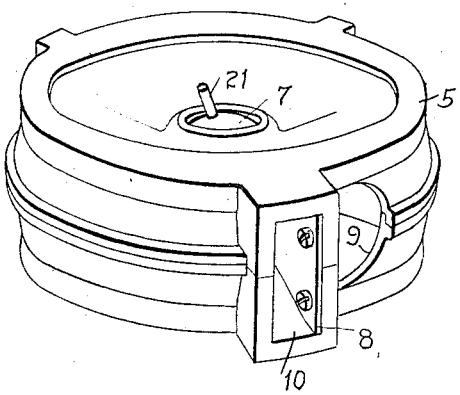
Figure 5:
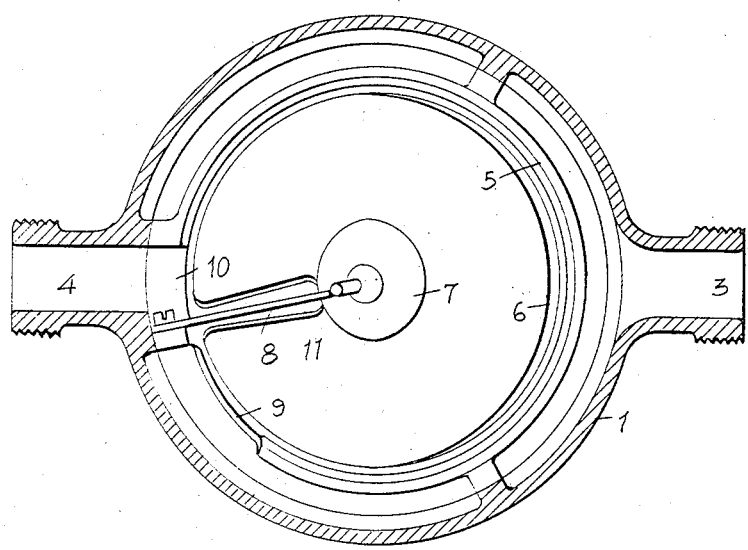

In said drawings: Figure 1 shows a central vertical section of a meter embodying my invention. Fig. 2 shows the top view of the meter, the upper section of the casing of the meter having been removed. Fig. 3 shows a detail elevation and partial section of one of the two-tooth lantern pinions and associated shafts and crank arms employed in the transmission mechanism of the meter. Fig. 3$^a$ shows a bottom view of the crank arm. Fig. 3$^b$ is a side elevation of an alternative form of two-tooth lantern pinion and Fig. 3$^c$ is a top view thereof. Fig. 4 shows a perspective elevation of the measuring chamber of the meter, and in particular shows the location of the inlet and outlet ports of that measuring chamber. Fig. 5 shows a horizontal section of the meter through the horizontal axis of the inlet and outlet ports of the measuring chamber, the upper section of the measuring chamber having been removed.

In the drawings, 1 designates the lower section of the casing of the meter, 2 the upper section thereof, 3 the inlet port of the casing, 4 the outlet port, 5 the measuring chamber (formed in two sections as shown), 6 the disk piston and 7 the spherical bearing member of the disk piston, mounted in a spherical socket formed in the two sections of the measuring chamber, as shown.

As is well known, the measuring chambers of nutating disk meters are commonly provided with a radial partition, termed a diaphragm, separating the inlet and outlet ports of the measuring chamber and extending radially inward into free joint forming contact with the spherical bearing member of the piston; the piston having a radial slot whereby said piston embraces the diaphragm. In Figs. 4 and 5, 8 designates the said diaphragm, 9 the inlet port of the measuring chamber, 10 the outlet port of that chamber, and 11 the said slot in the piston, through which slot the diaphragm 8 projects into close fit with the spherical bearing member 7 of the piston 6.

It is to be noted with respect to nutating disk meters of the type herein illustrated, that, due to necessary play between the diaphragm and the sides of the slot of the piston, there is a tendency for the piston to stop or stick at low rates of flow, when the slotted portion of the piston is at either the upper or lower extreme of its movement, due to direct passage from inlet to outlet in those most critical positions. In order to permit free nutation of the disk piston, relatively considerable play must be provided between the diaphragm and the walls of the slot 11; as a result, a direct passage from inlet to outlet is open, a little before and after the two extreme critical positions of the slotted portion of the disk. At ordinary rates of flow this leakage is immaterial, being compensated for in the calibration of the meter; but at very small rates of flow the ordinary nutating disk meter will often stop altogether when the piston is in one or near one or the other of its "critical" points, especially if the stuffing box spindle is tight, and the internal train of gears, actuated by the disk piston, hard to drive. To overcome these objections, I provide, as transmission mechanism, intermediate the piston of the meter, and the registering mechanism of the meter, a system of intermittent gearing, having, for each complete nutation of the disk piston, two cycles, each cycle comprising a period of drive and a period of rest; these periods of rest being synchronized with the critical periods of the meter piston. As a result the meter piston is practically relieved of load at the critical points of its operation, and thereby the tendency of the piston to "go to sleep" or stick in one or the other of its critical positions is reduced to a minimum. Such transmission mechanism, in the particular construction illustrated in the drawings, comprises reducing gearing consisting of a pinion (which is preferably a two tooth lantern pinion) 12, a spur gear 13 intermeshing with pinion 12, another pinion 14 (also preferably a two tooth lantern pinion) and a gear 15 driven by pinion 14.

In the drawings I have indicated the usual registering mechanism 16, driven by the spindle 17 and spider 18 from the gear 15 in the usual way. The pinion 12 is part of a shaft 19 having, as is customary, a crank arm 20 arranged to be engaged by the piston spindle 21. As the piston nutates rotary motion is communicated through the crank arm 20 to the shaft 19 and thence to the pinion 12. A two tooth pinion necessarily drives the gear intermeshing with such pinion intermittently. In Fig. 1 I have shown the meter piston 6 in one of its stated critical positions, and in Fig. 1 and also in Fig. 2 I have shown the pinion 12 in its corresponding position of inaction or "dead center" with respect to gear 13. Driving of the gear 13 by the pinion 12 must cease through an arc of several degrees extending on both sides of the position of the gear teeth of pinion 12 shown in Fig. 2.

It is important in meters that the central or highest-speed pinion of the mechanism directly driven by the disk piston shall be well mounted so as to prevent wear and preserve the true alinement of the parts. To that end I provide the said pinion with a double bearing, one below and one above the lantern pinion. To insure good and positive lasting driving it is desirable that the pinion and its gear shall be in full mesh. When so constructed, the teeth of the gear engaging the center pinion will project into the pinion beyond the center line of its bearings. These objects are attained in the construction herein illustrated and described, for the pinion (see particularly Fig. 3) is formed of two disks, 22 and 23, connected only by the lantern teeth 24; the shaft 25 carrying the crank arm 20 being connected to the disk 23 and the disk 22 having projecting from it a further shaft 26, which, though a rigid part of the structure 22—23—24—25, is not continuous with the shaft 25. In other words, the center of the pinion is open. The shaft 25 has a bearing in the bracket 27 of the meter, and the shaft 26 has a bearing in the bracket 28 of the meter. Thereby a double bearing is provided for the first pinion of the gear mechanism, one bearing being below the lantern the other above the lantern. As clearly appears in Fig. 2 the gear teeth of the gear 13 project through the center of the first pinion when in engagement with that pinion.

Functionally, shafts 25 and 26 may be considered as one shaft. For locating accurately the crank 20 on the shaft 25 a flat face is formed on one side of the said shaft, the aperture in the crank to receive such shaft being correspondingly flat on one side; and the flat side of the shaft 25 and of the aperture in the crank are carefully positioned so that when the piston is in either critical position the teeth of the first pinion 12 will be in such position with relation to the teeth of gear 13 that that gear is not being driven. With such an arrangement great simplicity, strength and reduction of speed, between the disk piston 6 and the stuffing box shaft 17, are obtained. The two wheels, 13 and 15, having only twenty five teeth, the teeth will consequently be very strong and the pins of the lantern pinion of large diameter. Using such a coarse pitch, the gears 13—15 can be made of hard rubber, which has been found to be the best material for the gears of these meters, although in former constructions employing gearing having only two speed reductions, the teeth of the gears have been, of necessity, so small as to make it impracticable to form those gears of hard rubber. In former constructions of meter mechanism employing lantern pinions, the teeth of the lantern pinions have been of almost needle fineness and so have been fragile, whereas in my construction herein illustrated and described, employing two-tooth lantern pinions, the teeth of these pinions may be large and relatively massive, as shown. Hard rubber is preferable as the material for the gears in these meter mechanisms, not only because it has good wearing qualities, but also because it is light.

In former meter mechanisms the central pinion has usually been a pinion of eight or more teeth, which fact has made it impossible to obtain the desired speed reduction in a gear train comprising two speed reductions only, except by the employment either of gears and pinions of very small pitch and which, therefore, are fragile, or else by the employment of very large gears, which, because of their relatively great size, occupy much room requiring a very large gearing chamber in the casing. The two-tooth lantern pinions employed in my mechanism herein illustrated and described, overcome this objection, affording the desired reduction in speed between the main driving or center pinion and the final spindle 17, while at the same time permitting the pinions and gears to be of large pitch, and permitting the gear train to comprise two speed reductions only, as above stated. A gear train of four elements and two speed reductions only, is desirable, in these meters, not only because of the relative simplicity of the mechanism, and because of its relative compactness, and therefore, relative low height of the upper member of the meter casing, but also because such a gear train has relatively little friction and relatively little inertia; the meter being, therefore, more responsive to sudden changes in rates of flow. If gear 13 has only twenty four teeth twelve rotations of the disk 6 will be required for one complete rotation of the gear 13; and with a two toothed pinion 14 driven by this gear 13, and if gear 15 driven by that pinion 14 have also twenty four teeth, one hundred and forty four rotations of the first pinion will produce one rotation only of the shaft 17. Of course, by increasing the number of teeth of the gears 13 and 15, a still greater speed reduction can be obtained; but ordinarily, a gear ratio of one hundred and forty four to one is ample, particularly when it is considered that at the two critical positions of the disk 6 that disk has nothing to drive but the first pinion itself.

In Figs. 3ᵇ and 3ᶜ I illustrate an alternative form of lantern pinion which has certain advantages, particularly from the standpoint of manufacture, over the form of pinion shown in Fig. 3. In the pinion shown in Figs. 3ᵇ and 3ᶜ I employ in lieu of the disks 22 and 23 of Fig. 3, narrow bars 22ª and 23ª, which are lighter than the disks 22 and 23, while serving the same purpose.

What I claim is:—

1. A fluid meter comprising in combination a main driving member having critical positions, and means driven thereby comprising gearing of an intermittent drive character, the periods of intermission in drive of which synchronize with the critical positions of the driving member.

2. A fluid meter comprising in combination a nutating disk and means driven thereby comprising intermittent gearing, the intermissions in the drive of which synchronize with the critical periods of the nutating disk.

3. A fluid meter comprising in combination a nutating disk, registering means and reducing gearing for transmitting motion from such disk to such registering means comprising intermittent drive elements, the intermissions in the drive of which synchronize with the critical periods of said disk.

4. In a fluid meter, the combination of a nutating disk, registering means, and means for communicating motion from said disk to said registering means comprising a gear and a pinion so related that during certain periods of rotation of the pinion the gear is not driven, such periods of no drive synchronizing with the critical positions of the disk.

5. A fluid meter comprising in combination a measuring member, a registering device, and means for communicating motion from said measuring member to said registering device, comprising a gear train, the highest speed member of which is a two-tooth lantern pinion having two bearings, one below and one above its lantern portion, said pinion having an open center.

6. A fluid meter comprising in combination a measuring member, a registering device, and means for communicating motion from said measuring member to said registering device, comprising a gear train, the highest speed member of which is a two-tooth lantern pinion having two bearings, one below and one above its lantern portion, said pinion having an open center, and a gear engaging the teeth of such lantern pinion, the teeth of such gear arranged to project beyond the central axis of the pinion when between the teeth of such pinion.

7. A fluid meter comprising in combination a main driving member, a two part shaft driven thereby and comprising lantern-teeth constituting the sole means of connection between the two parts of said shaft, the center of the pinion being open, said shaft having a bearing on each side of said pinion, registering means, and gearing for transmitting motion from said pinion to said registering means comprising a gear the teeth of which engage the teeth of such lantern pinion.

8. A fluid meter comprising in combination a measuring member, a registering device and means for communicating motion from said measuring member to said registering device comprising a gear train of two speed reductions only, and consisting of two two-tooth lantern pinions and gears intermeshing with such lantern pinions, the first or highest-speed pinion having bearings on each side of it, and having an open center adapted for the passage across the center of such pinion of the teeth of the intermeshing gear.

In testimony whereof I have signed this specification in the presence of two subscribing witnesses.

FRANK LAMBERT.

Witnesses:
H. M. MARBLE,
D. A. DAVIES.